T. M. CAMPBELL.
AUTOMATIC WAGON BRAKE.
APPLICATION FILED OCT. 11, 1912.

1,058,218.

Patented Apr. 8, 1913.

WITNESSES

INVENTOR
Thomas M. Campbell
Attorney

UNITED STATES PATENT OFFICE.

THOMAS M. CAMPBELL, OF CALLAWAY, NEBRASKA.

AUTOMATIC WAGON-BRAKE.

1,058,218. Specification of Letters Patent. Patented Apr. 8, 1913.

Application filed October 11, 1912. Serial No. 725,332.

*To all whom it may concern:*

Be it known that I, THOMAS M. CAMPBELL, a citizen of the United States, residing at Callaway, in the county of Custer and State of Nebraska, have invented certain new and useful Improvements in Automatic Wagon-Brakes, of which the following is a specification.

This invention relates to that class of wagon brakes which are automatically applied by the holding back of the team when going down hill.

It is the object of the invention to provide a simple and highly efficient and reliable brake mechanism of the kind stated, and also to provide a novel form of brake shoe which permits the wagon to be backed without the brake being applied.

With these objects in view, the invention consists in a combination and arrangement of parts to be hereinafter described and claimed.

Figure 1:
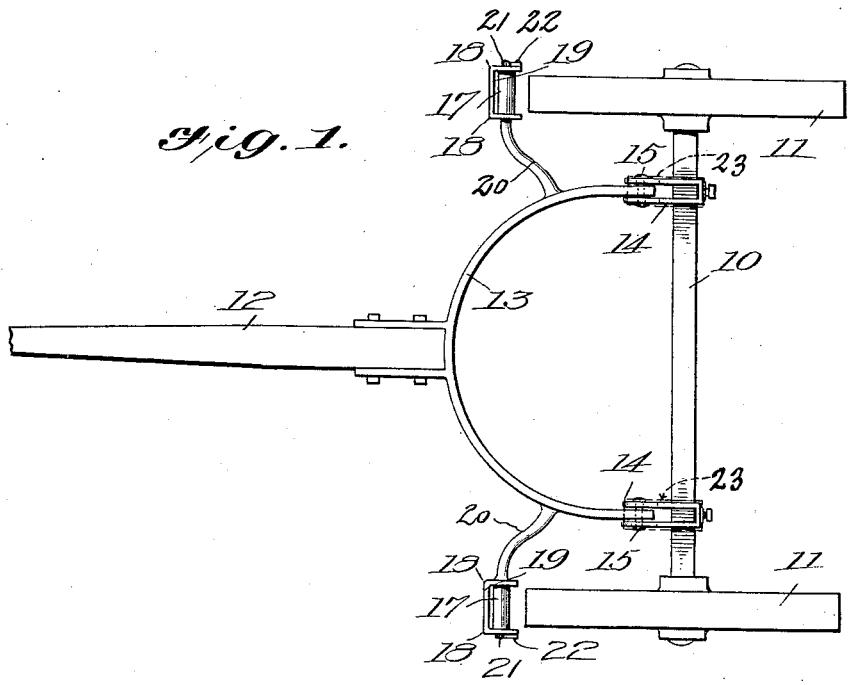
Figure 2:
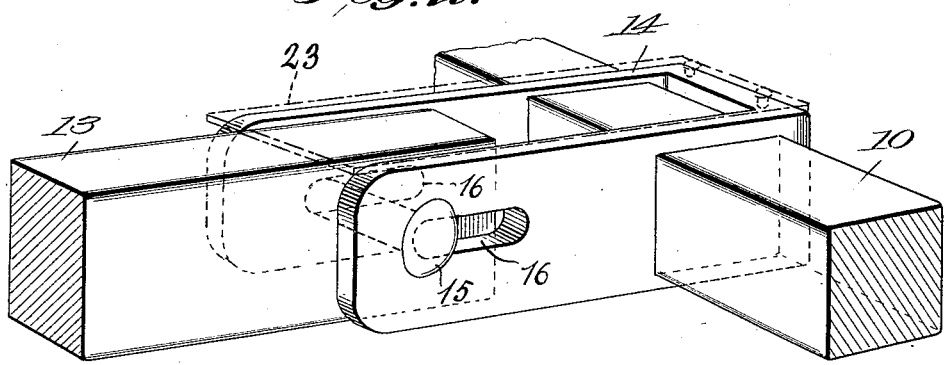
Figure 3:
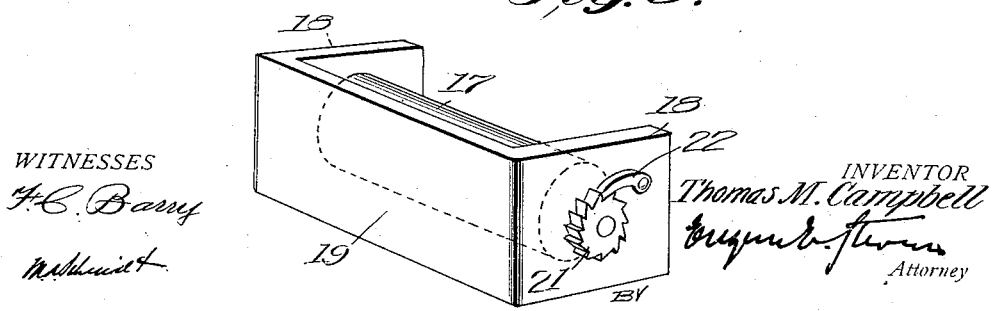

In the accompanying drawing forming a part of this specification Figure 1 is a plan view of the front portion of a wagon running gear showing the brake mechanism. Fig. 2 is a perspective view showing a connection between the tongue and the axle of the wagon. Fig. 3 is a perspective view showing the brake shoe.

Referring specifically to the drawing, 10 denotes the front axle of the running gear, and 11 denotes the wheels carried by said axle. The draft tongue or pole is indicated at 12, the same being connected at its butt end to a yoke 13, the two branches of which latter are connected to the axle 10 by clips 14. The connection between the yoke branches and the clips is such that the tongue slides rearward when the team is holding back, said connection being made by means of a cross-pin or bolt 15 carried by the clips and passing through a longitudinal slot 16 in the clips.

The brake shoe is a cylindrical block 17 carried by a brake-head, the latter comprising side walls 18 and an end wall 19 connecting the same at one end. The block 17 is journaled at its ends in the side walls 18 of the brake-head. This structure forms a frame which is open at one end so that the block 17 may come against the wheel. The brake-head is connected by an arm 20 to the yoke 13, in view of which it will be evident that the block 17 is jammed against the wheel when the tongue 12 is slid rearward by the holding back of the team. One of the brake-heads is connected to one of the yoke branches, and the other to the other yoke branch.

In order that the team may back the wagon without applying the brake, a pawl-and-ratchet mechanism is provided which locks the blocks against rotation in one direction. The blocks carry each a ratchet wheel 21, and to one of the side walls 18 is pivoted a pawl 22 which engages the ratchet wheel.

The pawl-and-ratchet mechanism is so arranged that the pawls slip and permit the blocks 17 to rotate when they are in contact with the wheels, and the latter are turning in a direction to back the wagon, in view of which no braking action takes place. However, when the wheels are turning in a direction to carry the wagon forward, and the blocks 17 are jammed against the wheels, a braking action takes place as the blocks are prevented from rotating by the pawl-and-ratchet mechanism. When the team again pulls forward the tongue 12 is pulled forward and the brakes are released.

A brake mechanism constructed and arranged as herein described is efficient and reliable in operation, and it is devoid of complicated parts to get out of order.

The preferred embodiment of the invention has been shown, but it will be evident that many minor changes in the structural details may be made without a departure from the spirit and scope of the invention, and it may be applied to all kinds of vehicles.

The clips 14 carry anti-rattler springs 23 (shown in dotted lines) which engage the butt ends of the yoke branches 13.

I claim:

1. The combination of a longitudinally slidable draft tongue, and a brake operatively connected to said tongue, said brake comprising a head, a cylindrical brake-shoe journaled in said head, a ratchet disk carried by the brake-shoe, and a pawl carried by the head and engageable with the ratchet disk.

2. The combination of a draft tongue, a yoke connected to the butt-end of the tongue, said yoke being slidable, arms extending from the yoke branches, brake-heads carried by the arms, cylindrical brake-shoes journaled in the brake-heads, ratchet disks carried by the brake-shoes, and pawls carried by the brake-heads and engageable with the ratchet disks.

In testimony whereof I affix my signature in presence of two witnesses.

THOMAS M. CAMPBELL.

Witnesses:
EVERETT H. YOUNG,
JOHN E. FELKER.

---

Copies of this patent may be obtained for five cents each, by addressing the "Commissioner of Patents, Washington, D. C."